United States Patent [19]

Lamarche

[11] Patent Number: 4,585,427
[45] Date of Patent: Apr. 29, 1986

[54] LONG TRAVEL SERIES DAMPER FOR CONTINUOUSLY VARIABLE TRANSMISSION

[75] Inventor: Paul E. Lamarche, Utica, Mich.

[73] Assignee: Borg-Warner Automotive, Inc., Troy, Mich.

[21] Appl. No.: 716,068

[22] Filed: Mar. 26, 1985

[51] Int. Cl.⁴ .............................................. F16D 3/14
[52] U.S. Cl. .................................. 464/67; 192/106.2; 464/68
[58] Field of Search ........................ 192/106.1, 106.2; 464/66, 67, 68

[56] References Cited

U.S. PATENT DOCUMENTS

| | | | |
|---|---|---|---|
| 2,574,573 | 11/1951 | Libby | 464/68 |
| 2,632,318 | 3/1953 | Meyer | 464/66 |
| 3,327,820 | 6/1967 | Maurice | 464/68 X |
| 4,188,805 | 2/1980 | Fall et al. | 192/106.2 X |
| 4,279,132 | 7/1981 | Lamarche | 192/106.2 X |
| 4,304,107 | 12/1981 | Fall et al. | 192/106.2 X |
| 4,441,595 | 4/1984 | Lamarche | 192/3.29 |
| 4,451,244 | 5/1984 | Lamarche | 464/68 |
| 4,538,718 | 9/1985 | Maucher | 464/68 X |

FOREIGN PATENT DOCUMENTS 1032601 12/1958 Fed. Rep. of Germany .
2111645 7/1983 United Kingdom .................. 464/67

Primary Examiner—Stuart S. Levy
Assistant Examiner—Daniel P. Stodola
Attorney, Agent, or Firm—James A. Geppert

[57] ABSTRACT

A long travel series damper assembly for a continuously variable transmission or similar arrangement which maintains minimal contact friction while equalizing manufacturing and loading tolerances without adding additional frictional forces. This assembly runs in a dry environment and includes a hub assembly having a barrel and a pair of hub drive plates encompassing the damper assembly and providing inwardly offset drive straps, a flywheel drive plate having radially inwardly extending drive arms corresponding in number to the drive straps, a floating idler divider encompassing the hub barrel and having circumferentially spaced dividers, compression damping springs located between the flywheel drive arms, the hub drive straps and the idler dividers, and at least two intermediate retaining rings, each of which is capable of movement independent of the hub assembly in one direction of rotation to limit the friction forces of the damper assembly.

21 Claims, 11 Drawing Figures

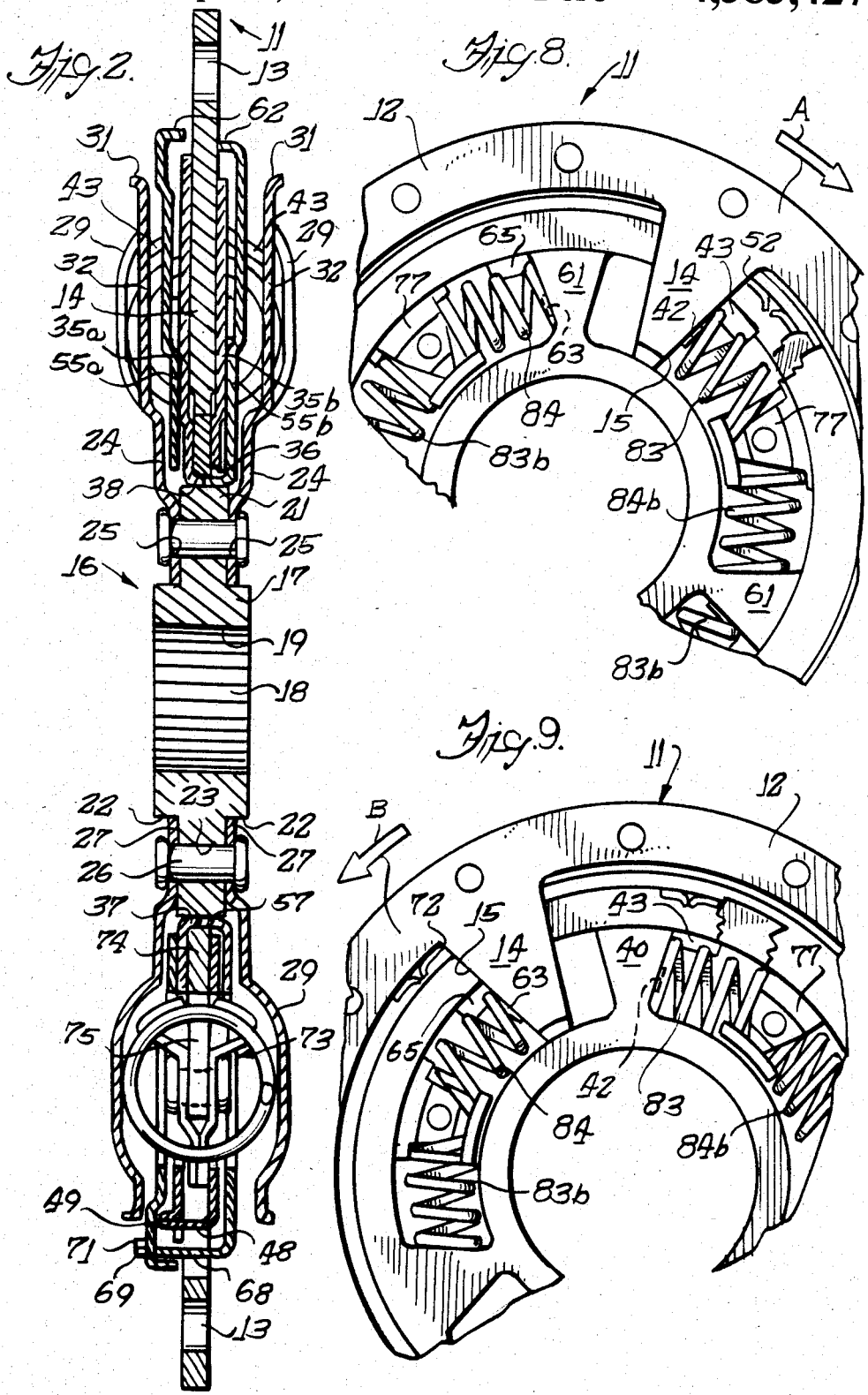

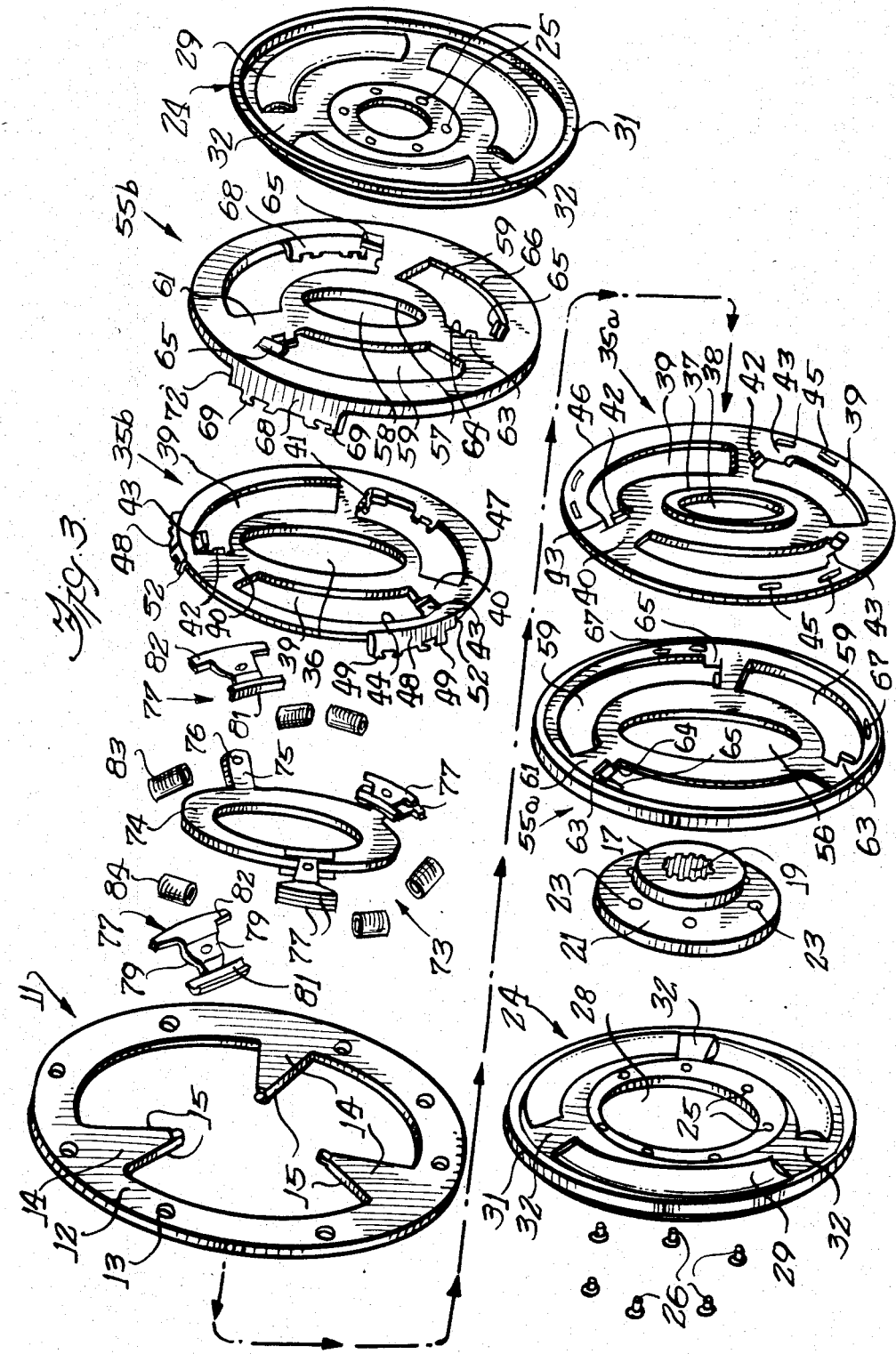

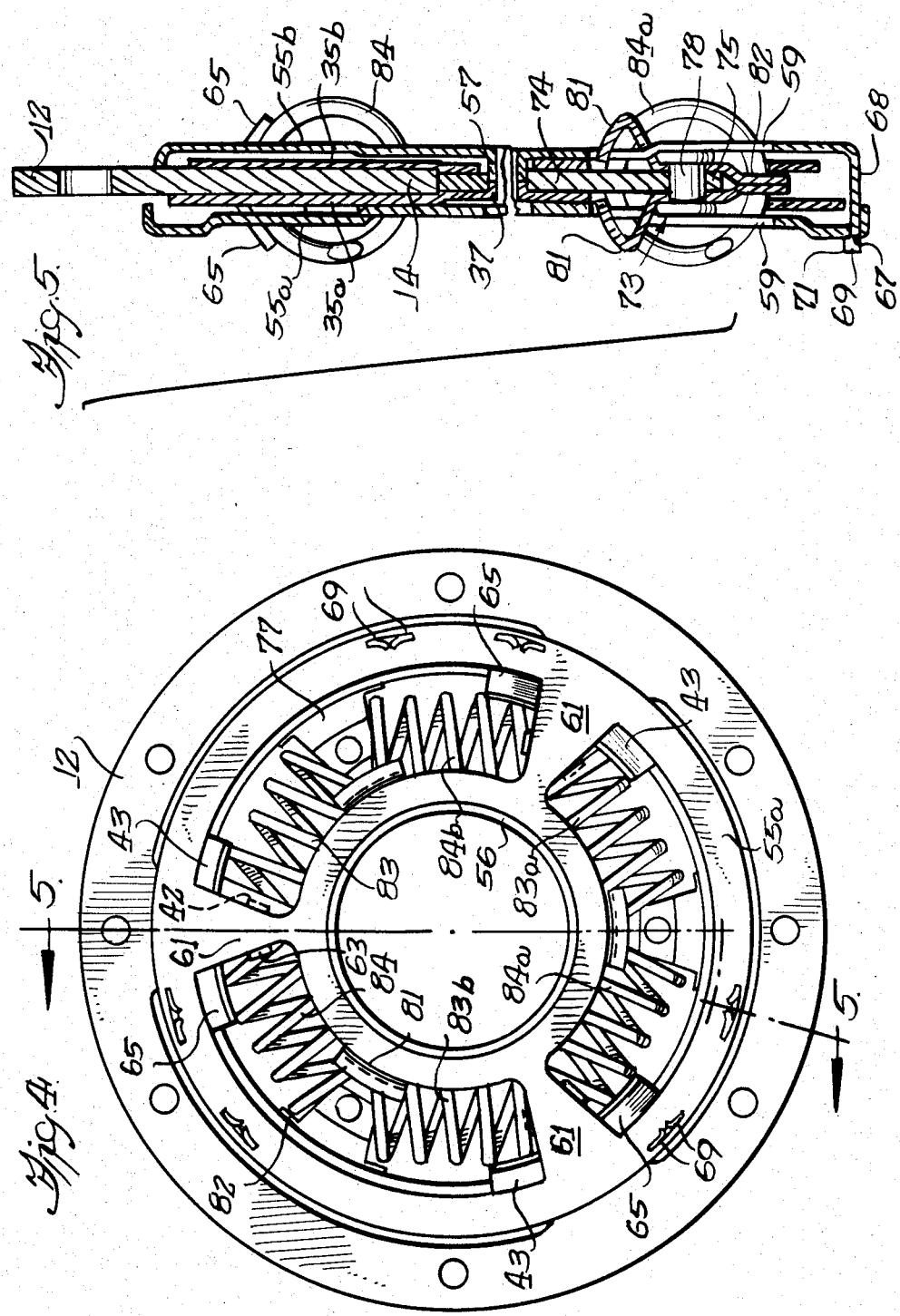

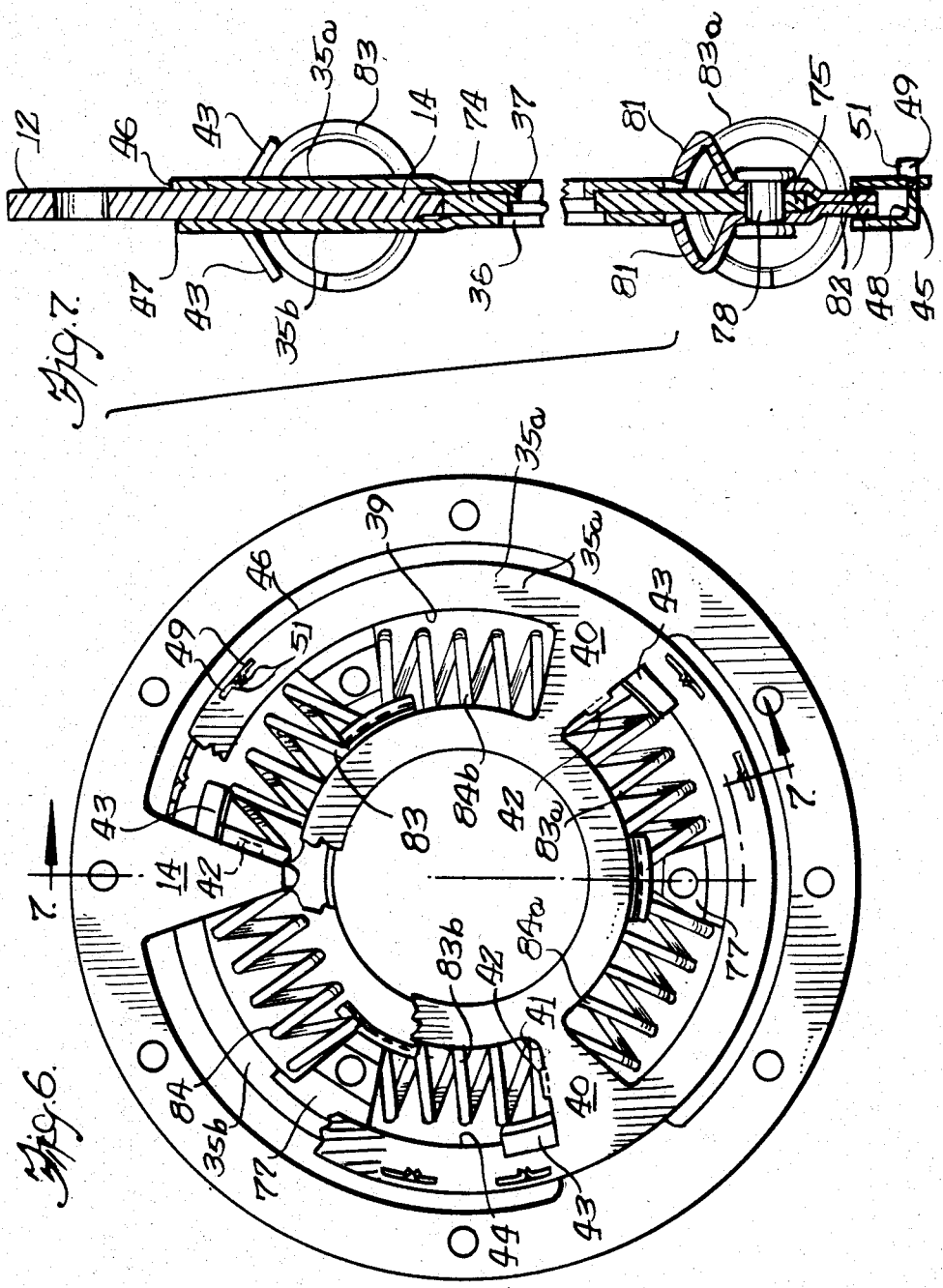

LONG TRAVEL SERIES DAMPER FOR CONTINUOUSLY VARIABLE TRANSMISSION

BACKGROUND OF THE INVENTION

The drive train for an automotive, marine or stationary industrial power system conventionally utilizes a clutch assembly interposed between an engine or driving means and a manual transmission; and a torsional vibration damper is used in the clutch assembly to neutralize any torsional vibrations or impulses emanating from the engine which would otherwise cause undesirable characteristics, e.g., impact loads, pulsation, noise, etc. in the transmission and/or driveline during operation of the system. With the use of a hydraulically-actuated torque converter, the vibration damper became unnecessary as any impulses or vibrations would be damped hydraulically in the torque converter.

In later developments where a lock-up clutch was interposed in the torque converter to by-pass the torque converter at higher speeds and provide a direct drive between the engine and transmission, the need for a vibration damper again arose. In the torque converter housing, the lock-up clutch pressure plate would be actuated by hydraulic fluid pressure from the converter to urge the plate against a friction surface in the housing to actuate the lock-up clutch. Also, the hydraulic fluid would be present in the vibration damper assembly.

Where a torque converter is not utilized and/or a torsional vibration damper is used in a dry environment, the frictional forces created in the damper due to manufacturing and loading tolerances and any frictional contact of the damper springs result in undesirable and difficult to control friction and wear characteristics. Also, centrifugal forces acting on the springs may create friction and wear patterns affecting the operation and efficiency of the damper. The present invention provides a dry environment series torsional vibration damper assembly which will overcome the problems previously discussed.

SUMMARY OF THE INVENTION

The present invention relates to a low friction long travel series damper assembly, which is especially adapted for use in a continuously variable transmission or similar arrangement. The damper is used in a dry environment without adding undue frictional forces in the operation of the damper. The assembly includes a torque input member having radially inwardly extending driving arms or projections, a hub assembly comprising a flanged hub barrel with a pair of hub drive plates secured thereto and forming a housing for the damper, a pair of inner retaining rings and a pair of intermediate retaining rings, an idler divider assembly floating within the hub barrel and a plurality of damper springs.

The present invention also comprehends the provision of a novel low friction, dry environment series damper wherein the torque input member and hub assembly are rotatable in opposite directions while each pair of retaining rings has projecting tabs or ears cooperating with the flywheel drive plate and the hub assembly to limit independent rotation thereof to one direction of movement. The inner and intermediate rings are arranged so that each pair of rings is capable of movement in opposite directions to limit the effect of centrifugal forces on the damper springs.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged cross sectional view of the damper taken on the irregular line 2—2 of FIG. 1.

FIG. 3 is an exploded perspective view of the damper assembly of FIGS. 1 and 2.

FIG. 4 is an elevational view of the damper assembly with the hub assembly removed.

FIG. 5 is a cross sectional view taken on the irregular line 5—5 of FIG. 4.

FIG. 6 is an elevational view of the damper similar to FIG. 4, but with the intermediate retaining rings removed.

FIG. 7 is a cross sectional view taken on the irregular line 7—7 of FIG. 6.

FIG. 8 is a partial elevational view of the damper assembly of FIG. 4 and showing torque applied in a clockwise direction.

FIG. 9 is a partial elevational view similar to FIG. 8, but showing torque applied in a counterclockwise direction.

DESCRIPTION OF THE PREFERRED EMBODIMENT

Figure 1:
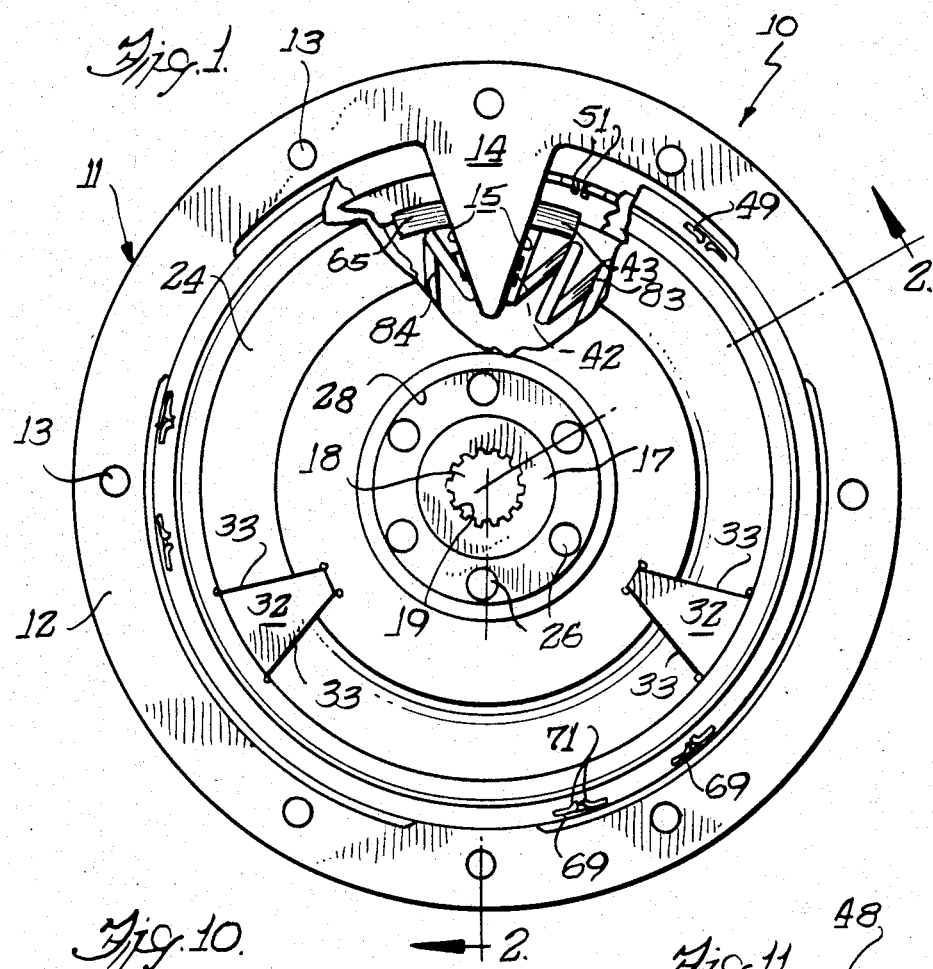
FIG. 1 is an elevational view, with portions broken away, of the vibration damper assembly of the present invention.
Figure 10:
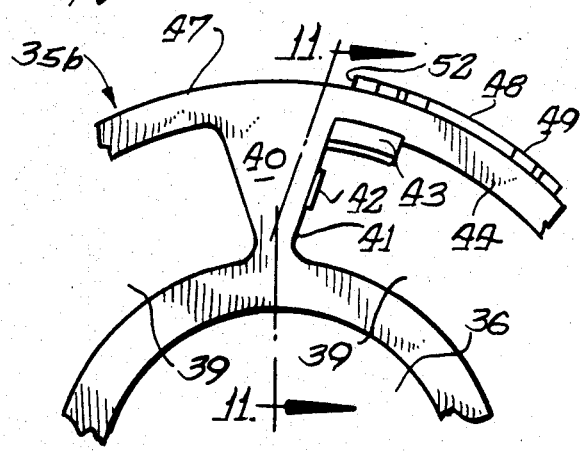
FIG. 10 is a partial elevational view of an inner retaining ring for the damper assembly.
Figure 11:
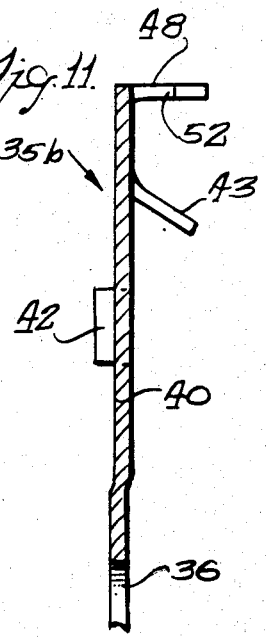
FIG. 11 is a cross sectional view of the inner retaining ring taken on the irregular line 11—11 of FIG. 10.

Referring more particularly to the disclosure in the drawings wherein is shown an illustrative embodiment of the present invention, FIGS. 1 and 2 disclose a long travel torsional vibration damper assembly 10, particularly suited for use in the dry environment of a continously variable transmission, wherein torque is introduced through a flywheel drive plate 11 in the form of an annular plate or ring 12 having bolt holes 13 to secure the plate to a clutch, flywheel or other driving means. Extending radially inward from the ring are a plurality of tapered drive tangs or arms 14 (shown as three in number) having inwardly converging spring-engaging edge surfaces 15.

The torque output to a driven shaft (not shown) utilizes a hub assembly 16 comprising a hub barrel 17 with a central passage 18 therethrough and defining splines 19 cooperating with a splined end on the driven shaft. An integral hub flange 21 defines annular shoulders 22 on the barrel on opposite sides thereof, and a pair of hub drive plates 24,24 are secured to the hub flange through openings 23 in the flange and aligned openings 25 in the plates to receive suitable securing means, such as rivets 26. The pair of outer hub drive plates 24,24 form a housing for the damper assembly. The plates are identical mirror images and each has an annular flat portion 27 defining a central opening 28 receiving the hub barrel 17 with the rivet openings 25 therein, an outwardly bulged or concave portion 29 terminating in an outwardly extending flanged edge 31. A plurality of inwardly offset drive straps 32 corresponding in number to the drive tangs 14 are formed in the bulged portion to extend into the path of damper springs to be later described; the drive strap 32 and tangs 14 being axially aligned where no torque is applied.

A pair of inner retaining rings 35a,35b are located adjacent to the flywheel drive plate 11 and are generally annular with a central opening 36 in plate 35b, and an inner flange 37 in plate 35a defining a central opening 38 therein. A plurality of arcuate slots 39 separated by tapered connecting arms 40 are formed in each plate; each plate having an inwardly directed tab 42 on one edge 41 of each arm and an outwardly and downwardly inclined ear 43 on the outer edge 44 of each slot 39 adjacent the tab 42. The plate 35a has circumferentially spaced pairs of slots 45 arranged adjacent the outer periphery 46 thereof, and plate 35b has three circumferentially spaced acruate flange portions 48 on the periphery 47 thereof terminating in pairs of shaped tabs 49. When plates 35a and 35b are assembled onto the flywheel drive plate 11, the flange portions 48 extend within the annular ring 12 with the tabs 49 projecting into and through the slots 45, and wings 51 on the tabs are bent over to secure the plates together.

A pair of intermediate retaining rings 55a,55b are located between the inner retaining rings 35a,35b and the outer hub drive plates 24,24. Both plates are generally annular with plate 55a having a central opening 56, and plate 55b having an inner flange 57 defining a central opening 58 and abutting the flange 37 of inner ring 35a. Both plates have a plurality of arcuate slots 59 separated by connecting arms 61 and terminate in peripheral flanges 62. An inward extending tab 63 is formed on one edge 64 of each arm 61 and an outwardly and downwardly inclined ear 65 is formed on the outer edge 66 of each slot 59 adjacent the tab 63; the tabs 63 on edges 64 of arms 61 are positioned on the side of the arm opposite to the tabs 42 on arms 41 of the inner retaining rings 35a,35b. The plate 55a has circumferentially spaced slots 67 adjacent the outer flange 62, while plate 55b includes arcuate flange portions 68 extending from its peripheral flange and terminating in shaped tabs 69 projecting into and through the slots 67. Each tab 69 has wing portions 71 that are bent over to secure the intermediate rings together.

Mounted within the flywheel drive plate 11 and the inner retaining rings 35a,35b is an idler divider assembly 73 consisting of a divider ring 74 having a plurality of radial arms 75, corresponding in number to the drive arms, etc., each arm having an elongated slot 76 adjacent its outer edge. A pair of divider halves 77,77 are secured to each arm by a rivet 78 passing through the slot 76. Each divider half 77 includes a body portion having an opening for the rivet 78 and outwardly diverging contact edge 79,79, inner circumferentially oppositely extending and outwardly bent legs 81,81 and outer circumferentially oppositely extending arms 82,82. The ring 74 is journalled generally on the hub flange and floats within the flywheel drive plate with the radial arms 75 extending into and dividing the arcuate slots into a pair of spring pockets for damper springs 83,84,83a, 84a,83b and 84b.

Considering the damper assembly 10, the inner and intermediate retaining rings 35a,35b and 55a,55b, respectively, depending on the direction of movement, follow and carry springs through deflection and effects of centrifugal forces. The idler dividers are employed to carry the springs which limits friction and frictional forces. The slots 76 in the arms 75 of the divider ring 74 allows the divider assembly 73 to equalize load and manufacturing tolerance differences from other groups of damper springs, thus assuring proper performance and maximizing travel while minimizing stress concentrations.

The damper springs are held by the ears 65 on the intermediate retaining rings from both radial and lateral movement. Likewise the ears 43 on the inner retaining rings restrain the ends of the damper springs from radial and lateral movement. As seen in FIG. 8, where torque is applied to the flywheel drive plate 11 to rotate in the clockwise direction of rotation shown by arrow A, the edge surfaces 15 of the drive arms 14 engage the tabs 42 on the arms 40 of the inner retaining rings 35a,35b and the edges 52 on the arcuate flange portions 48. Thus, both the drive arms 14 and the connecting arms 40 on the inner retaining rings 35a,35b engage the ends of damper springs 83,83a,83b to compress the springs and transfer the load to the idler divider halves 77 by means of surfaces or edges 79; the arms 82 holding the springs down from the effects of centrifugal forces. Also, the divider legs 81 form a cup that keeps the spring ends from lateral movement.

Load is passed through to the opposite contact edges 79 to transfer to the springs 84,84a,84b and onto the edges 33 of the drive straps 32 of the hub drive plates 24. Torque is transferred from the drive plates to the hub barrel 17 riveted thereto and to the driven shaft by means of the splines 19. The springs 84,84a, 84b also contact the edges of the connecting arms 61 for the intermediate retaining rings 55a,55b causing simultaneous rotation of the intermediate retaining rings with the hub drive plates.

If torque is applied in the opposite direction of rotation as seen by arrow B in FIG. 9, then the opposite edge surfaces 15 of the drive arms 14 engage both the inward tabs 63 of arm 61 and the edges 72 of arcuate flange portions 68 on the intermediate retaining rings 55a,55b to engage and compress the damper springs 84,84a,84b and transfer load to the idler divider assembly 73. Load is passed through to the other damper springs 83,83a, 83b, onto the edges of the drive straps 32 and thence to the hub barrel and input shaft. In this direction of motion, the inner retaining rings rotate simultaneously with the hub drive plates. Both the inner and intermediate retaining rings, depending on the direction as to which pair of rings perform, contains the damper springs in such a fashion as to limit the amount of friction and frictional forces in the damper assembly.

I claim:

1. A low friction, dry environment vibration damper assembly to transmit torque between driving and driven members, comprising a flywheel drive plate operatively connected to torque input means, a hub assembly operatively connected to torque output means, and resilient means interposed between the flywheel drive plate and the hub assembly, said flywheel drive plate including an annular ring having a plurality of radially inwardly tapered drive arms extending into the path of the resilient means, said hub assembly including a barrel and integral radial flange and a pair of hub drive plates secured to the flange and encompassing the damper assembly, each plate having a plurality of inwardly offset drive straps in the path of said resilient means, and a floating idler divider having a plurality of radial arms interposed between pairs of said resilient means, the improvement comprising at least two retaining rings interposed between said hub drive plates and said flywheel drive plate, means on each ring for enabling movement of each ring with said flywheel drive plate in one direction of motion independent of said hub assembly and enabling said rings to rotate independently in opposite directions.

2. A vibration damper assembly as set forth in claim 1, wherein each hub drive plate includes a central flat annular portion secured to the hub flange and an outwardly bulged portion encompassing said resilient means and having said drive straps integral therewith.

3. A vibration damper assembly as set forth in claim 2, in which said resilient means comprise compression springs received within said bulged portions of said drive plates.

4. A vibration damper assembly as set forth in claim 1, wherein each retaining ring includes a plurality of arcuate slots receiving said resilient means and separated by integral connecting arms, each arm including said means for enabling movement which comprises an inward tab extending into the path of and adapted to be contacted by a tapered drive arm of said flywheel drive plate.

5. A vibration damper assembly as set forth in claim 4, wherein each retaining ring includes an outwardly and downwardly inclined ear adjacent each connecting arm adapted to retain said resilient means against radial and lateral movement and to engage one of said offset drive straps on said hub drive plates.

6. A vibration damper assembly as set forth in claim 5, in which said flywheel drive arms, hub drive plate drive straps, and retaining ring connecting arms correspond in number and are in axial alignment in the absence of torque loading.

7. A vibration damper assembly as set forth in claim 1, wherein said idler divider comprises an annular ring having a plurality of circumferentially spaced radial arms, each arm having a slot therein, and a pair of divider halves riveted to each arm.

8. A vibration damper assembly as set forth in claim 7, wherein said divider halves include a tapered body portion with circumferentially oppositely extending inner legs and outer arms forming cups receiving said resilient means.

9. A vibration damper assembly as set forth in claim 8, in which said slots in the divider ring arms allowed adjustment of said divider halves to equalize load and manufacturing tolerances.

10. A vibration damper assembly as set forth in claim 1, in which said retaining rings each comprise a pair of rings connected together to form a pair of inner retaining rings adjacent said flywheel drive plate and a pair of intermediate retaining rings located between said inner retaining rings and said hub drive plates.

11. A vibration damper assembly as set forth in claim 10, wherein said hub drive plate drive straps correspond in number to said flywheel drive arms, said retaining rings each having arcuate slots separated by connecting arms corresponding in number to said flywheel drive arms.

12. A vibration damper assembly as set forth in claim 11, wherein each arcuate slot of said retaining rings houses a pair of resilient means with an idler divider arm interposed therebetween.

13. A vibration damper assembly as set forth in claim 12, wherein said resilient means are compression damper springs.

14. A vibration damper assembly as set forth in claim 11, wherein each retaining ring includes said means for enabling movement which comprises an inwardly extending tab on one edge of each connecting arm in the path of a flywheel drive arm and an outwardly and downwardly inclined ear on the outer edge of each slot adjacent said tab, said tabs and ears on the inner retaining rings being on the sides of the connecting arms opposite to the tabs and ears on the intermediate retaining rings.

15. A vibration damper assembly as set forth in claim 14, wherein one of said inner retaining rings includes slots adjacent its periphery and arcuate flange portions on the other inner retaining ring having tabs received in said slots to secure the rings together, an edge of each flange being generally radially aligned with a tab on each said connecting arm.

16. A vibration damper assembly as set forth in claim 15, wherein one said intermediate retaining rings has slots adjacent its periphery and the other retaining ring includes arcuate flange portions with tabs received in said slots to connecting said rings together, an edge of each flange portion being generally radially aligned with a tab on each said connecting arm.

17. A vibration damper assembly as set forth in claim 16, wherein said flange portions of said inner and intermediate retaining rings are positioned on opposite sides of said connecting arms and are in the path of and adapted to be engaged by said flywheel drive arms simultaneously with said tabs.

18. A vibration damper assembly as set forth in claim 17, wherein said retaining ring ears engage said hub drive plate drive straps to rotate therewith depending on the direction of rotation.

19. A vibration damper assembly as set forth in claim 17, wherein said idler divider includes a pair of divider halves secured to each arm, each half includes a tapered body with a pair of circumferentially oppositely extending inner legs and outer arms forming cups for the ends of said resilient means.

20. A vibration damper assembly as set forth in claim 19, wherein said divider half pairs are interposed between pairs of resilient means in each set of arcuate slots for said inner and intermediate retaining rings.

21. A vibration damper assembly as set forth in claim 20, in which each divider arm has a slot therein receiving securing means for said divider halves to allow adjustment thereof.

* * * * *